US010793664B2

(12) United States Patent
Lomölder et al.

(10) Patent No.: US 10,793,664 B2
(45) Date of Patent: Oct. 6, 2020

(54) PROCESS FOR PREPARING TRIMERS AND/OR OLIGOMERS OF DIISOCYANATES

(71) Applicant: Evonik Degussa GmbH, Essen (DE)

(72) Inventors: Rainer Lomölder, Münster (DE); Christoph Nacke, Schermbeck (DE); Melanie Sajitz, Essen (DE); Emmanouil Spyrou, Schermbeck (DE); Dirk Hoppe, Nottuln (DE)

(73) Assignee: Evonik Operations GmbH, Essen (DE)

( * ) Notice: Subject to any disclaimer, the term of this patent is extended or adjusted under 35 U.S.C. 154(b) by 81 days.

(21) Appl. No.: 15/970,998

(22) Filed: May 4, 2018

(65) Prior Publication Data
US 2018/0327538 A1 Nov. 15, 2018

(30) Foreign Application Priority Data

May 9, 2017 (EP) .................... 17170116

(51) Int. Cl.
| C08G 18/75 | (2006.01) |
| C08G 18/73 | (2006.01) |
| C08G 18/02 | (2006.01) |
| C08G 18/09 | (2006.01) |
| C08G 18/16 | (2006.01) |
| C08G 18/18 | (2006.01) |

(52) U.S. Cl.
CPC .......... *C08G 18/73* (2013.01); *C08G 18/022* (2013.01); *C08G 18/092* (2013.01); *C08G 18/166* (2013.01); *C08G 18/1875* (2013.01); *C08G 18/755* (2013.01); *C08G 18/758* (2013.01)

(58) Field of Classification Search
CPC ................................ C08G 18/73; C08G 18/75
USPC ..................................... 528/44, 67
See application file for complete search history.

(56) References Cited

U.S. PATENT DOCUMENTS

| 3,996,223 A | 12/1976 | Gupta et al. |
| 4,186,255 A | 1/1980 | Klein et al. |
| 4,324,879 A | 4/1982 | Bock et al. |
| 4,379,905 A | 4/1983 | Stemmler et al. |
| 4,454,317 A | 6/1984 | Disteldorf et al. |
| 4,503,226 A | 3/1985 | Kuo-Chang et al. |
| 4,596,678 A | 6/1986 | Merger |
| 4,596,679 A | 6/1986 | Hellbach et al. |
| 4,697,014 A | 9/1987 | Robin |
| 5,087,739 A | 2/1992 | Bohmholdt et al. |
| 5,208,334 A | 5/1993 | Potter et al. |
| 5,221,743 A | 6/1993 | Goldstein et al. |
| 5,258,482 A | 11/1993 | Jacobs et al. |
| 5,606,004 A | 2/1997 | Brahm et al. |
| 5,837,795 A | 11/1998 | Lomoelder et al. |
| 5,837,796 A | 11/1998 | Scholl et al. |
| 5,905,151 A | 5/1999 | Slack et al. |
| 5,914,383 A | 6/1999 | Richter et al. |
| 6,093,817 A | 7/2000 | Kohlstruk et al. |
| 6,160,075 A | 12/2000 | Plogmann et al. |
| 6,172,175 B1 | 1/2001 | Plogmann et al. |
| 6,258,915 B1 | 7/2001 | Spyrou et al. |
| 6,417,313 B2 | 9/2002 | Spyrou |
| 6,452,003 B1 | 9/2002 | Ewald et al. |
| 6,495,650 B2 | 12/2002 | Kohlstruk et al. |
| 7,307,135 B2 | 11/2007 | Spyrou |
| 7,709,589 B2 | 4/2010 | Spyrou et al. |
| 8,569,440 B2 | 10/2013 | Spyrou et al. |
| 8,674,050 B2 | 3/2014 | Spyrou |
| 8,917,914 B2 | 12/2014 | Zheng |
| 9,175,126 B2 | 11/2015 | Albrecht et al. |
| 2005/0239956 A1 | 10/2005 | Spyrou et al. |
| 2005/0239992 A1 | 10/2005 | Spyrou et al. |
| 2007/0282089 A1 | 6/2007 | Spyrou |
| 2007/0266897 A1 | 11/2007 | Spyrou |
| 2008/0171816 A1 | 7/2008 | Spyrou et al. |
| 2008/0265201 A1 | 10/2008 | Spyrou et al. |
| 2010/0168329 A1 | 7/2010 | Hoppe et al. |
| 2010/0227942 A1 | 9/2010 | Spyrou et al. |
| 2012/0065424 A1 | 3/2012 | Spyrou et al. |
| 2012/0071577 A1 | 3/2012 | Pfeffer et al. |
| 2012/0077932 A1 | 3/2012 | Pfeffer et al. |
| 2012/0313031 A1 | 12/2012 | Hoppe et al. |
| 2015/0232609 A1 | 8/2015 | Spyrou et al. |
| 2015/0266992 A1 | 9/2015 | Spyrou et al. |

FOREIGN PATENT DOCUMENTS

| CA | 2113890 A1 | 8/1994 |
| CN | 103450443 A | 12/2013 |
| DE | 1954093 A1 | 6/1970 |
| DE | 19627825 A1 | 10/1996 |
| DE | 19642324 A1 | 4/1998 |
| EP | 0017998 A1 | 4/1979 |
| EP | 0156159 A1 | 12/1981 |
| EP | 0126299 A1 | 4/1984 |
| EP | 0126300 A1 | 4/1984 |
| EP | 0197864 A1 | 2/1986 |
| EP | 0355443 A2 | 7/1989 |
| EP | 0524501 A1 | 7/1992 |
| EP | 0696606 A1 | 7/1995 |
| EP | 0798299 A1 | 8/2003 |
| GB | 1244416 A | 11/1969 |

*Primary Examiner* — Duc Truong
(74) *Attorney, Agent, or Firm* — Nexsen Pruet PLLC; Philip P. McCann

(57) ABSTRACT

A process for preparing trimers and/or oligomers of diisocyanates is disclosed along with a composition of trimers and/or oligomers formed from diisocyanates and monomeric diisocyanates obtainable by reaction of I. 5-94.999% by weight of A) at least one diisocyanate having a boiling point of less than 250° C. (at standard pressure) and/or B) at least one diisocyanate having a boiling point of 250-350° C. (at standard pressure), in the presence of II. 94.999-5% by weight of C) at least one diisocyanate having a boiling point above 350° C. (at standard pressure), III. in the presence of at least one trimerization catalyst in amounts of 0.001% to 5% by weight, and the amounts of I.-III. add up to 100% by weight.

20 Claims, No Drawings

PROCESS FOR PREPARING TRIMERS AND/OR OLIGOMERS OF DIISOCYANATES

CROSS REFERENCE TO RELATED APPLICATIONS

This application is a 35 U.S.C. § 111(c) U.S. national phase entry of European Patent Office Application No. 17170116.2 having a filing date of May 9, 2017, of which is incorporated herein by reference in its entirety.

FIELD

Polyurethanes are valuable raw materials for the paints, adhesives, sealants and plastics industries. They are usually produced from the reaction of polyisocyanates and alcohol components. In order to assure adequate stability, it is advantageous to use polyisocyanates having a functionality of >2. Particularly frequently used for this purpose are isocyanurates that result from the trimerization and oligomerization of diisocyanates. In addition, such a reaction lowers the proportion of volatile diisocyanates that are thus a matter of toxicological concern. To date, however, after a trimerization step of this kind, there has been a need for a costly and inconvenient distillative removal of the excess monomeric diisocyanate.

BACKGROUND

There have already been descriptions of mixed trimerizations. For instance, in DE 1954093, HDI and TDI were co-trimerized and the excess monomers were removed with the aid of a short-path or thin-film distillation. This process was improved in EP 0696606 in that, through high contents of aliphatic NCO groups, it was possible to lower the proportion of aromatic residual monomers below 0.5% by weight even without distillation. However, what is common to both is that, on the one hand, non-UV-stable aromatic isocyanates are used, but, on the other hand, high proportions of monomeric isocyanates having a low boiling point remain in the end product. The situation is also quite similar in the Chinese patent CN 103450443 A (Preparation method of aromatic and aliphatic mixed isocyanurate curing agent). DE19642324 concerns mixed trimerization of cyclohexyl diisocyanate and aromatic diisocyanates. There is no need for distillative removal of monomers here, but non-light-stable aromatic components remain in the end product here too.

In US258482, mixtures of HDI and H12MDI are trimerized after a monoalcohol has been used beforehand, since it functions as a necessary cocatalyst. After the trimerization, the trimerization catalyst has to be deactivated with an inhibitor. The corresponding end products, after distillative removal of the monomeric diisocyanates, have lower viscosities than corresponding comparative products. Both the use of alcohols (which reduce functionality and NCO content) and the need to add inhibitors restrict the industrial usability of this teaching.

In DE19627825, mixtures of cyclohexyl diisocyanates are subjected to mixed trimerization with other diisocyanates (e.g. HDI, IPDI). Subsequently, the residual monomer content is removed by distillation.

In "Synthesis of HDI/IPDI hybrid isocyanurate and its application in polyurethane coating", Progress in Organic Coatings 78 (2015) 225-233, HDI and IPDI are subjected to mixed trimerization, in order to achieve advantages in application, for example higher TG or else better DOI.

There has been no shortage of efforts in the past to lower the proportion of low-boiling monomeric diisocyanates in a raw material or a formulation. This is typically accomplished with the aid of distillative methods, but this means both additional apparatus complexity and thermal stress, which can in turn lead to an alteration, for example discolouration of the product.

Even at low concentrations, isocyanates show an acute and chronic effect in man. Therefore, the maximum workplace concentrations for diisocyanates according to TRGS 900 are 0.02 to 0.05 $mg/m^3$. As well as the substance-specific toxicological effect, diisocyanates also differ in their vapour pressure and boiling point. For instance, given the same starting conditions, according to the vapour pressure and boiling point, different amounts of diisocyanate are released to the ambient air, meaning that the permissible limit is reached earlier, later or not at all. In this respect, it seems advantageous for purposes of workplace hygiene to as far as possible avoid diisocyanates having a high vapour pressure or low boiling point. The text which follows is geared solely to the boiling point, since it is firstly closely correlated to the vapour pressure, but secondly can be inferred much more reliably from literature, or calculations.

For a simpler assessment, the diisocyanates are to be divided into three categories depending on their boiling point, since there is a drop in volatility and hence hazardousness with a higher boiling point. Diisocyanates having a boiling point of <250° C. are to be referred to as volatile, diisocyanates having a boiling point of 250-350° C. are to be referred to as moderately volatile diisocyanates, and diisocyanates having a boiling point above 350° C. are to be referred to as sparingly volatile.

If an attempt is made to prepare isocyanurates having a low monomer content of diisocyanates through maximum completeness of trimerization/oligomerization, two unwanted effects are observed. Firstly, viscosity increases drastically (increase in the degree of oligomerization or in the average molar mass) as the reaction progresses (degree of conversion). Secondly, the reaction decreases to an ever greater degree at a minimal concentration of NCO groups, such that no further conversion can be achieved even in solvents. Therefore, an unwanted portion of monomeric diisocyanate remains in the end product after the reaction. These monomers have to be removed from the end product by distillation.

SUMMARY

The problem addressed by the present invention was therefore that of making available isocyanurates formed from volatile and/or moderately volatile diisocyanates having a low monomer content of volatile and/or moderately volatile diisocyanates, but without having to resort to the step of distillative removal which is costly and inconvenient and causes thermal stress.

DETAILED DESCRIPTION

It has been found that, surprisingly, diisocyanates having a boiling point above 350° C., for example H12MDI, can be used as solvents in order to trimerize volatile and/or moderately volatile diisocyanates therein, such that it is possible to dispense with the distillative removal of the monomeric volatile and/or moderately volatile diisocyanates.

The invention provides a composition of trimers and/or oligomers formed from diisocyanates and monomeric diisocyanates,
obtainable by reaction of
I. 5-94.999% by weight of
A) at least one diisocyanate having a boiling point of less than 250° C.
and/or
B) at least one diisocyanate having a boiling point of 250-350° C.,
in the presence of
II. 94.999-5% by weight of
C) at least one diisocyanate having a boiling point above 350° C.,
III. in the presence of at least one trimerization catalyst in amounts of 0.001% to 5% by weight,
and the amounts of add up to 100% by weight,
where the proportion of monomeric A) and/or monomeric B) after the reaction in the mixture, based on the overall mixture of A)+B)+C), in absolute terms is not greater than 20% by weight, and based on the diisocyanate A) and/or B) used is not greater than 40% by weight in relative terms.

This means that at least 60% by weight of the components A) and/or B) used have been converted to trimers and/or oligomers, based on the sum total of A) and B).

The invention provides a process for producing compositions of trimers and/or oligomers from diisocyanates and monomeric diisocyanates,
obtainable by reaction of
I. 5-94.999% by weight of
A) at least one diisocyanate having a boiling point of less than 250° C.
and/or
B) at least one diisocyanate having a boiling point of 250-350° C.,
in the presence of
II. 94.999-5% by weight of
C) at least one diisocyanate having a boiling point above 350° C.,
III. in the presence of at least one trimerization catalyst in amounts of 0.001% to 5% by weight,
and the amounts of I.-II. add up to 100% by weight,
where the proportion of monomeric A) and/or monomeric B) after the reaction in the mixture, based on the overall mixture of A)+B)+C), in absolute terms is not greater than 20% by weight, and based on the diisocyanate A) and/or B) used is not greater than 40% by weight in relative terms.

This means that at least 60% by weight of the components A) and/or B) used have been converted to trimers and/or oligomers, based on the sum total of A) and B).

The invention also provides for the use
of the composition of trimers and/or oligomers formed from diisocyanates and monomeric diisocyanates,
obtainable by reaction of
I. 5-94.999% by weight of
A) at least one diisocyanate having a boiling point of less than 250° C.
and/or
B) at least one diisocyanate having a boiling point of 250-350° C.,
in the presence of
II. 94.999-5% by weight of
C) at least one diisocyanate having a boiling point above 350° C.,
III. in the presence of at least one trimerization catalyst in amounts of 0.001% to 5% by weight,
and the amounts of add up to 100% by weight,
where the proportion of monomeric A) and/or monomeric B) after the reaction in the mixture, based on the overall mixture of A)+B)+C), in absolute terms is not greater than 20% by weight, and based on the volatile or moderately volatile diisocyanate A) or B) used is not greater than 40% by weight in relative terms,
in paints, adhesives, sealants and/or plastics.

The trimerization of diisocyanates is known and has already been described frequently. In principle, polyisocyanurates are obtained by catalytic trimerization of suitable diisocyanates. The trimerization according to the invention affords pure trimers and/or oligomeric trimers, or mixed trimers or mixed oligomers.

Suitable diisocyanates A) and B) in the context of this invention are volatile diisocyanates A) and/or moderately volatile diisocyanates B), preferably aliphatic and/or cycloaliphatic diisocyanates.

In principle, diisocyanates suitable for trimerization can be prepared by various methods (Annalen der Chemie 562 (1949), p. 75ff.). A particularly useful method in industry has been found to be the preparation by phosgenation of organic polyamines to give the corresponding polycarbamoyl chlorides and the thermal cleavage thereof to organic polyisocyanates and hydrogen chloride. Alternatively, organic polyisocyanates can also be prepared without use of phosgene, i.e. by phosgene-free methods. According to EP-A-126 299 (U.S. Pat. No. 4,596,678), EP-A-126 300 (U.S. Pat. No. 4,596,679) and EP-A-355 443 (U.S. Pat. No. 5,087, 739), for example, (cyclo)aliphatic diisocyanates such as 1-isocyanato-3-isocyanatomethyl-3,5,5-trimethylcyclohexane (isophorone diisocyanate or IPDI) can be made available by reacting the parent (cyclo)aliphatic diamines with urea and alcohols to give (cyclo)aliphatic biscarbamoyl esters and thermal cleavage thereof to give the corresponding diisocyanates and alcohols.

All the boiling points listed here for definition of volatility (at standard pressure (SP)=1013 mbar) have either been taken from the literature or else have been converted from literature data from the boiling points at lower pressures. For this purpose, the following Sigma-Aldrich conversion program from the Internet was used: http://www.sigmaaldrich.com/chemistry/solvents/learning-center/nomo-assets.html.

If no literature data were known, the boiling point was estimated with the aid of Advanced Chem. Develop. Software V11.02, from 2016.

Volatile diisocyanates A) are, for example, butyl diisocyanate, b.p.: 228° C. (SP), converted from 112-113° C. at 19 Torr (*J. Polym. Sci.,* 1964, V 2(8; Pt. A), P 3387-404) and ethyl diisocyanate, b.p.: 189° C. (SP), converted from 81° C. at 20 Torr (*Journal of Polymer Science* 1964, V 2(8; Pt. A), P 3387-404).

Moderately volatile diisocyanates B) are, for example, isophorone diisocyanate (IPDI), b.p.: 295° C. (SP), converted from 217° C. at 100 Torr (National Institute for Occupational Safety and Health), hexamethylene diisocyanate (HDI), b.p.: 255° C. (SP, *Prog. in org. Coatings,* 2010, V 69(4), P 426-341), norbonane diisocyanate, b.p.: 313±15° C. (SP, calculated with Advanced Chem. Develop. Software V11.02), mixture of 2,2,4- and 2,4,4-trimethylhexamethylene diisocyanate (TMDI), b.p.: 284° C. (SP, calculated with Advanced Chem. Develop. Software V11.02), lysine diisocyanate ethyl ester, b.p.: 305±37° C. (SP, calculated with Advanced Chem. Develop. Software V11.02) and m-xylylene diisocyanate, b.p.: 297° C. (SP), converted from 159-162° C. at 12 Torr (*Annalen der Chemie,* 1949, V 562, P 75-136).

A preferred moderately volatile diisocyanate B) is IPDI.

Sparingly volatile diisocyanates C) are, for example, dicyclohexylmethylene diisocyanate ($H_{12}MDI$), b.p.: 410° C. (SP), converted from 156-158° C. at 0.1 Torr from *Annalen der Chemie*, 1949, 562, P 75-136 and octadecane diisocyanate, b.p.: 435±18° C. (SP, calculated with Advanced Chem. Develop. Software V11.02).

A preferred sparingly volatile diisocyanate C) is $H_{12}MDI$.

The invention preferably provides a composition of trimers and/or oligomers formed from diisocyanates and monomeric diisocyanates,
obtainable by reaction of
I. 5-94.999% by weight of
A) at least one diisocyanate having a boiling point of less than 250° C., selected from butyl diisocyanate and ethyl diisocyanate,
and/or
B) at least one diisocyanate having a boiling point of 250-350° C. selected from isophorone diisocyanate (IPDI), hexamethylene diisocyanate (HDI), norbornane diisocyanate, mixture of 2,2,4- and 2,4,4-trimethylhexamethylene diisocyanate (TMDI), lysine diisocyanate ethyl ester and/or m-xylylene diisocyanate,
in the presence of
II. 94.999-5% by weight of
C) at least one diisocyanate having a boiling point above 350° C., selected from dicyclohexylmethylene diisocyanate (H12MDI) and/or octadecane diisocyanate,
III. in the presence of at least one trimerization catalyst in amounts of 0.001% to 5% by weight,
and the amounts of I.-III. add up to 100% by weight,
where the proportion of monomeric A) and/or monomeric B) after the reaction in the mixture, based on the overall mixture of A)+B)+C), in absolute terms is not greater than 20% by weight, and based on the diisocyanate A) and/or B) used is not greater than 40% by weight in relative terms.

The invention most preferably provides a composition of trimers and/or oligomers formed from diisocyanates and monomeric diisocyanates,
obtainable by reaction of
I. 5-94.999% by weight of
B) isophorone diisocyanate (IPDI)
in the presence of
II. 94.999-5% by weight of
C) dicyclohexylmethylene diisocyanate (H12MDI),
III. in the presence of at least one trimerization catalyst in amounts of 0.001% to 5% by weight,
and the amounts of I.-III. add up to 100% by weight,
where the proportion of monomeric B) after the reaction in the mixture, based on the overall mixture of B)+C), in absolute terms is not greater than 20% by weight, and based on the diisocyanate B) used is not greater than 40% by weight in relative terms.

Suitable trimerization catalysts are, for example, tertiary amines (U.S. Pat. No. 3,996,223), alkali metal salts of carboxylic acids (CA 2113890; EP 56159), quaternary ammonium salts (EP 798299; EP 524501; U.S. Pat. Nos. 4,186,255; 5,258,482; 4,503,226; U.S. Pat. No. 5,221,743), aminosilanes (EP 197864; U.S. Pat. No. 4,697,014) and quaternary hydroxyalkylammonium salts (EP 17998; U.S. Pat. No. 4,324,879) and/or quaternary phosphonium salts. Depending on the catalyst, the use of various co-catalysts is also possible, for example OH-functionalized compounds or Mannich bases formed from secondary amines and aldehydes or ketones.

For the reaction, the diisocyanates are left to react in the presence of the catalyst, optionally with use of solvents and/or auxiliaries, until the desired conversion has been attained. Thereafter, the reaction can be stopped by deactivating the catalyst. This is done by adding a catalyst inhibitor. With regard to the trimerization of diisocyanates on the industrial scale, particular preference is given to the use of quaternary hydroxyalkylammonium carboxylates as catalysts. This type of catalyst is thermally labile and allows controlled thermal deactivation, and so it is unnecessary to stop the trimerization on attainment of the desired conversion by metered addition of potentially quality-reducing inhibitors.

Catalysts used are preferably quaternary ammonium salts on their own or in mixtures, more preferably tetraalkylammonium salts and/or quaternary phosphonium salts, with halogens, hydroxides, alkoxides or organic or inorganic acid anions as counterion.

Examples of these are:

tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate, and tetrabutylphosphonium acetate, tetrabutylphosphonium formate and ethyltriphenylphosphonium acetate, tetrabutylphosphonium benzotriazolate, tetraphenylphosphonium phenolate and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methoxide, methyltriethylammonium methoxide, tetramethylammonium methoxide, tetraethylammonium methoxide, tetrapropylammonium methoxide, tetrabutylammonium methoxide, tetrapentylammonium methoxide, tetrahexylammonium methoxide, tetraoctylammonium methoxide, tetradecylammonium methoxide, tetradecyltrihexylammonium methoxide, tetraoctadecylammonium methoxide, benzyltrimethylammonium methoxide, benzyltriethylammonium methoxide, trimethylphenylammonium methoxide, triethylmethylammonium methoxide, trimethylvinylammonium methoxide, methyltributylammonium ethoxide, methyltriethylammonium ethoxide, tetramethylammonium ethoxide, tetraethylammonium ethoxide, tetrapropylammonium ethoxide, tetrabutylammonium ethoxide, tetrapentylammonium ethoxide, tetrahexylammonium ethoxide, tetraoctylammonium methoxide, tetradecylammonium ethoxide, tetradecyltrihexylammonium ethoxide, tetraoctadecylammonium ethoxide, benzyltrimethylammonium ethoxide, benzyltriethylammonium ethoxide, trimethylphenylammonium ethoxide, triethylmethylammonium ethoxide, trimethylvinylammonium ethoxide, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride. These catalysts may be added alone or in mixtures. Preference is given to using tetraethylammonium hydroxide.

According to the invention, the trimerization is conducted either batchwise or continuously. The batchwise method is preferred. The batchwise method in a stirred reactor is generally conducted at ambient pressure (standard pressure, 1013 mbar), but other pressures are also possible. This involves initially charging a mixture of 94.999-5% by weight of C) and 5-94.999% by weight of a further volatile diisocyanate A) and/or moderately volatile diisocyanate B). First the mixture of the diisocyanates is preheated to a temperature of 0-140° C., preferably of 55-90° C., more preferably of 65-75° C., then the catalyst is metered in in amounts of 0.001% to 5% by weight; the trimerization is exothermic. The catalyst is first metered in in such an amount that a distinct rise in the temperature of the reaction mixture by 5-15° C. is apparent. Since the catalyst is deactivated in the course of the reaction, the temperature of the reaction mixture drops again over the course of the reaction and a new metered addition of catalyst can be effected. This operation is repeated until the desired conversion has been attained. The sequence of catalyst deactivation and re-initiation of the trimerization by replenishment of catalyst in portions allows optimal process control at any time, both in relation to the conversion and with regard to the temperature profile of the reaction.

The catalyst can be used in pure form. However, for more exact metered addition and optimal mixing of the catalyst, it is advantageous to dissolve the catalyst in a suitable solvent. Suitable solvents in principle are those in which the catalyst has good solubility, for example water, low molecular weight alcohols such as methanol or ethylene glycol, or lower molecular weight organic acids, for example acetic acid or hexanoic acid.

The continuous trimerization can be conducted in a stirred tank cascade. Also conceivable is a combination of stirred tank cascade and tubular reactor.

To restrict the necessary amount of catalyst based on the conversion desired, the temperature profile of the process according to the invention should be set up such that the reaction solution as far as possible does not exceed a temperature of 95° C.

After the trimerization reaction, it is optionally possible to add a catalyst poison, but this is usually unnecessary.

The resultant composition according to the invention comprises, as well as the residual monomers, also pure and mixed trimerizates and oligomerizates of the diisocyanates A) and/or B) and C) used. This mixture can be used as it is or in blends as NCO component in paint, adhesive, sealant or plastic formulations.

The trimerization is continued to such an extent that the proportion of monomeric A) and/or monomeric B) after the reaction in the mixture, based on the overall mixture of A)+B)+C), in absolute terms is not greater than 20% by weight, and based on the volatile or moderately volatile diisocyanate A) or B) used is not greater than 40% by weight in relative terms.

Preference is given to absolute values of <10% by weight and, in relative terms, <20% by weight. Particular preference is given to values of <3% by weight in absolute terms and <6% by weight in relative terms.

EXAMPLES

General Procedure

A mixture of 70% by weight of VESTANAT $H_{12}$MDI, C) dicyclohexylmethylene diisocyanate, (b.p.: 410° C. Evonik Industries AG) and 30% by weight of VESTANAT IPDI, B) isophorone diisocyanate (IPDI), (b.p.: 295° C., Evonik Industries AG) in a stirred three-neck flask is heated up to a particular starting temperature and a catalyst (tetraethylammonium hydroxide, TEAOH, Aldrich) is added, whereupon an exothermic reaction sets in immediately. After the catalyst has been added, the heat source is removed and the product cools down gradually after a few minutes of the exothermic reaction. After cooling, the amount of p-toluenesulfonic acid (Aldrich) equivalent to the catalyst is added. 91 g of tetraethylammonium hydroxide here correspond to 172 g of p-toluenesulfonic acid.

| | Catalyst TEAOH [% by wt.] | Starting temperature [° C.] | NCO content [% by wt.] | Temp. maximum [° C.] | Free IPDI (relative to output) [% by wt.] | Free H$_{12}$MDI [% by wt.] |
|---|---|---|---|---|---|---|
| Experiment 1 | 0.25 | 80 | 24.2 | 131 | 3.7 (10.2) | 49.2 |
| Experiment 2 | 0.25 | 100 | 25.9 | 137 | 7.4 (24.7) | 54.4 |
| Experiment 3 | 0.5 | 80 | 21.2 | 142 | 0.5 (1.7) | 37.1 |
| Experiment 4 | 0.2 | 80 | 24.7 | 128 | 4.7 (15.7) | 51.3 |
| Experiment 5 | 0.1 | 80 | 27.3 | 120 | 10.4 (34.7) | 62.8 |

The residual monomer content of IPDI in all experiments is less than 20% by weight (free IPDI, left-hand column, absolute). Based on the IPDI used, a relative residual monomer content of ≤40% by weight is to be observed (free IPDI, right-hand column in brackets, relative), calculated from:

(Final concentration of IPDI/starting concentration of IPDI)×100=relative residual monomer content of IPDI

What is claimed is:

1. A composition of trimers and/or oligomers formed from diisocyanates and monomeric diisocyanates, the composition comprising the reaction product of
   I. from 5 to 94.999% by weight of
      A) an aliphatic and/or cycloaliphatic diisocyanate having a boiling point of less than 250° C. (at standard pressure)
      and/or
      B) an aliphatic and/or cycloaliphatic diisocyanate having a boiling point of from 250 to 350° C. (at standard pressure),
   in the presence of
   II. from 94.999 to −5% by weight of
      C) a diisocyanate having a boiling point above 350° C. (at standard pressure) wherein the diisocyanate is selected from the group consisting of dicyclohexylmethylene diisocyanate (H$_{12}$MDI) and octadecane diisocyanate,
   III. in the presence of at least one trimerization catalyst in amounts of from 0.001% to 5% by weight,
   and the amounts of add up to 100% by weight,
   where the proportion of monomeric A) and/or monomeric B) after the reaction in the mixture, based on the overall mixture of A)+B)+C), in absolute terms is not greater than 10% by weight, and based on the diisocyanate A) and/or B) used is not greater than 20% by weight in relative terms.

2. The composition according to claim 1, wherein at least 60% by weight of the components A) and/or B) used has been converted to trimers and/or oligomers, based on the sum total of A) and B) and wherein a step of distillative removal is not required.

3. The composition according to claim 1, wherein the aliphatic and/or cycloaliphatic diisocyanate A) has a boiling point of less than 250° C., selected from the group consisting of butyl diisocyanate and ethyl diisocyanate.

4. The composition according to claim 1, wherein the aliphatic and/or cycloaliphatic diisocyanate B) having a boiling point of from 250 to 350° C., is selected from the group consisting of isophorone diisocyanate (IPDI), hexamethylene diisocyanate (HDI), norbornane diisocyanate, mixture of 2,2,4- and 2,4,4-trimethylhexamethylene diisocyanate (TMDI), lysine diisocyanate ethyl ester and m-xylylene diisocyanate.

5. The composition according to claim 1, wherein the diisocyanate C) is dicyclohexylmethylene diisocyanate (H$_{12}$MDI).

6. The composition according to claim 1 comprising the reaction product of
   I. from 5 to 94.999% by weight of
      A) the aliphatic and/or cycloaliphatic diisocyanate having a boiling point of less than 250° C. is selected from the group consisting of butyl diisocyanate and ethyl diisocyanate,
      and/or
      B) an aliphatic and/or cycloaliphatic diisocyanate having a boiling point of 250-350° C. is selected from the group consisting of isophorone diisocyanate (IPDI), hexamethylene diisocyanate (HDI), norbornane diisocyanate, mixture of 2,2,4- and 2,4,4-trimethylhexamethylene diisocyanate (TMDI), and lysine diisocyanate ethyl ester,
   in the presence of
   II. from 94.999 to 5% by weight of
      C) a diisocyanate having a boiling point above 350° C., selected from the group consisting of dicyclohexylmethylene diisocyanate (H$_{12}$MDI) and octadecane diisocyanate,
   III. in the presence of at least one trimerization catalyst in amounts of from 0.001% to 5% by weight,
   and the amounts of add up to 100% by weight,
   where the proportion of monomeric A) and/or monomeric B) after the reaction in the mixture, based on the overall mixture of A)+B)+C), in absolute terms is not greater than 3% by weight, and based on the aliphatic and/or cycloaliphatic diisocyanate A) and/or B) used is not greater than 6% by weight in relative terms.

7. The composition according to claim 1 comprising the reaction product of
   I. from 5 to 94.999% by weight of
      B) isophorone diisocyanate (IPDI) in the presence of
   II. from 94.999 to 5% by weight of
      C) dicyclohexylmethylene diisocyanate (H$_{12}$MDI),
   III. in the presence of at least one trimerization catalyst in amounts of from 0.001% to 5% by weight,
   and the amounts of add up to 100% by weight.

8. The composition according to claim 1, wherein the trimerization catalysts III. are selected from the group consisting of tertiary amines, alkali metal salts of carboxylic acids, quaternary ammonium salts, aminosilanes, quaternary hydroxyalkylammonium salts, quaternary phosphonium salts, on their own or in mixtures.

9. The composition according to claim 1, wherein trimerization catalysts III. are selected from the group consisting of quaternary ammonium salts and quaternary phosphonium salts are used, on their own or in mixtures.

10. The composition according to claim 1, wherein trimerization catalysts III. are selected from the group consisting of quaternary tetraalkylammonium salts and quaternary phosphonium salts, with halogens, hydroxides, alkoxides or organic or inorganic acid anions as counterion, are used, on their own or in mixtures.

11. The composition according to claim 1, wherein the trimerization catalyst III. is tetraethylammonium hydroxide.

12. A process for producing compositions of trimers and/or oligomers from diisocyanates and monomeric diisocyanates
comprising the steps of reacting
I. from 5 to 94.999% by weight of
A) an aliphatic and/or cycloaliphatic diisocyanate having a boiling point of less than 250° C.
and/or
B) an aliphatic and/or cycloaliphatic diisocyanate having a boiling point of 250-350° C.,
in the presence of
II. from 94.999 to 5% by weight of
C) a having a boiling point above 350° C. wherein the diisocyanate is selected from the group consisting of dicyclohexylmethylene diisocyanate ($H_{12}$MDI) and octadecane diisocyanate,
III. in the presence of at least one trimerization catalyst in amounts of from 0.001% to 5% by weight,
and the amounts of add up to 100% by weight,
where the proportion of monomeric A) and/or monomeric B) after the reaction in the mixture, based on the overall mixture of A)+B)+C), in absolute terms is not greater than 20% by weight, and based on the aliphatic and/or cycloaliphatic diisocyanate A) and/or B) used is not greater than 40% by weight in relative terms.

13. A process according to claim 12, wherein the reaction is effected at temperatures of 0 to 140° C.

14. A paint comprising the reaction product of
I. from 5 to 94.999% by weight of
A) an aliphatic and/or cycloaliphatic having a boiling point of less than 250° C.
and/or
B) an aliphatic and/or cycloaliphatic diisocyanate having a boiling point of 250-350° C.,
in the presence of
II. from 94.999 to 5% by weight of
C) a having a boiling point above 350° C. wherein the diisocyanate is selected from the group consisting of dicyclohexylmethylene diisocyanate ($H_{12}$MDI) and octadecane diisocyanate,
III. in the presence of at least one trimerization catalyst in amounts of from 0.001% to 5% by weight,
and the amounts of add up to 100% by weight,
where the proportion of monomeric A) and/or monomeric B) after the reaction in the mixture, based on the overall mixture of A)+B)+C), in absolute terms is not greater than 20% by weight, and based on the aliphatic and/or cycloaliphatic diisocyanate A) and/or B) used is not greater than 40% by weight in relative terms, in paints, adhesives, sealants and/or plastics.

15. The process according to claim 12, wherein the aliphatic and/or cycloaliphatic A) has a boiling point of less than 250° C., selected from the group consisting of butyl diisocyanate and ethyl diisocyanate.

16. The process according to claim 12, wherein the aliphatic and/or cycloaliphatic diisocyanate B) having a boiling point of from 250-350° C. is selected from the group consisting of isophorone diisocyanate (IPDI), hexamethylene diisocyanate (HDI), norbornane diisocyanate, mixture of 2,2,4- and 2,4,4-trimethylhexamethylene diisocyanate (TMDI), lysine diisocyanate ethyl ester and m-xylylene diisocyanate.

17. The process according to claim 12, wherein the diisocyanate C) is dicyclohexylmethylene diisocyanate ($H_{12}$MDI).

18. The process according to claim 12, comprising the steps of reacting
I. from 5 to 94.999% by weight of
A) the aliphatic and/or cycloaliphatic diisocyanate having a boiling point of less than 250° C. is selected from the group consisting of butyl diisocyanate and ethyl diisocyanate,
and/or
B) the aliphatic and/or cycloaliphatic diisocyanate having a boiling point of 250-350° C. is selected from the group consisting of isophorone diisocyanate (IPDI), hexamethylene diisocyanate (HDI), norbornane diisocyanate, mixture of 2,2,4- and 2,4,4-trimethylhexamethylene diisocyanate (TMDI), lysine diisocyanate ethyl ester and m-xylylene diisocyanate,
in the presence of
II. from 94.999 to 5% by weight of
C) octadecane diisocyanate,
III. in the presence of at least one trimerization catalyst in amounts of from 0.001% to 5% by weight,
and the amounts of add up to 100% by weight,
where the proportion of monomeric A) and/or monomeric B) after the reaction in the mixture, based on the overall mixture of A)+B)+C), in absolute terms is not greater than 20% by weight, and based on the aliphatic and/or cycloaliphatic diisocyanate A) and/or B) used is not greater than 40% by weight in relative terms.

19. The process according to claim 12, comprising the steps of reacting
I. from 5 to 94.999% by weight of
B) isophorone diisocyanate (IPDI)
in the presence of
II. from 94.999 to 5% by weight of
C) dicyclohexylmethylene diisocyanate ($H_{12}$MDI),
III. in the presence of at least one trimerization catalyst in amounts of from 0.001% to 5% by weight,
and the amounts of add up to 100% by weight,
where the proportion of monomeric B) after the reaction in the mixture, based on the overall mixture of B)+C), in absolute terms is not greater than 20% by weight, and based on the aliphatic and/or cycloaliphatic diisocyanate B) used is not greater than 40% by weight in relative terms.

20. The process according to claim 12, comprising the steps of reacting, wherein the trimerization catalysts III. are selected from the group consisting of tertiary amines, alkali metal salts of carboxylic acids, quaternary ammonium salts, aminosilanes, quaternary hydroxyalkylammonium salts, quaternary phosphonium salts, on their own or in mixtures.

* * * * *

UNITED STATES PATENT AND TRADEMARK OFFICE
CERTIFICATE OF CORRECTION

PATENT NO. : 10,793,664 B2
APPLICATION NO. : 15/970998
DATED : October 6, 2020
INVENTOR(S) : Rainer Lomölder et al.

It is certified that error appears in the above-identified patent and that said Letters Patent is hereby corrected as shown below:

In the Claims

Column 10,
Line 54, In Claim 7, "the amounts of add up to 100%" should read -- the amounts of I.-III. add up to 100% --.

Column 11,
Line 24, In Claim 12, "the amounts of add up to 100%" should read -- the amounts of I.-III. add up to 100% --.
Line 49, In Claim 14, "the amounts of add up to 100%" should read -- the amounts of I.-III. add up to 100% --.

Column 12,
Line 32, In Claim 18, "the amounts of add up to 100%" should read -- the amounts of I.-III. add up to 100% --.
Line 49, In Claim 19, "the amounts of add up to 100%" should read -- the amounts of I.-III. add up to 100% --.

Signed and Sealed this
Nineteenth Day of January, 2021

Andrei Iancu
*Director of the United States Patent and Trademark Office*